United States Patent [19]
Bush et al.

[11] Patent Number: 5,908,261
[45] Date of Patent: Jun. 1, 1999

[54] TURNBUCKLE AND METHOD OF MAKING A TURNBUCKLE

[75] Inventors: John D. Bush, Kenosha, Wis.; William L. Foley, Libertyville, Ill.

[73] Assignee: AMSTED Industries Incorporated, Chicago, Ill.

[21] Appl. No.: 08/907,336

[22] Filed: Aug. 6, 1997

[51] Int. Cl.⁶ .................................................... F16B 7/06
[52] U.S. Cl. .............................. 403/43; 403/44; 29/896.7
[58] Field of Search ............................... 403/43–48, 404; 29/896.7; 174/178, 57

[56] References Cited

U.S. PATENT DOCUMENTS

| | | | |
|---|---|---|---|
| 1,012,008 | 12/1911 | Post ............................................. | 403/46 |
| 1,876,720 | 9/1932 | Merrill ..................................... | 29/896.7 |
| 2,403,828 | 7/1946 | Rawlins et al. ........................... | 287/60 |
| 3,590,464 | 7/1971 | Wildi et al. ............................. | 403/43 X |
| 3,633,951 | 1/1972 | Hinkle et al. ....................... | 29/896.7 X |
| 3,716,258 | 2/1973 | Lange et al. ............................... | 403/44 |
| 3,925,869 | 12/1975 | Thompson ............................. | 403/43 X |
| 4,085,623 | 4/1978 | Yuda ..................................... | 403/46 X |
| 4,097,163 | 6/1978 | Dubuque .............................. | 403/46 X |
| 4,226,550 | 10/1980 | Kupcak et al. .................... | 29/896.7 X |
| 4,454,376 | 6/1984 | Holder et al. ......................... | 403/43 X |
| 4,704,918 | 11/1987 | Orkin et al. .......................... | 74/579 R |
| 5,367,825 | 11/1994 | Doring .................................. | 403/46 X |

FOREIGN PATENT DOCUMENTS

| | | | |
|---|---|---|---|
| 0 321 228 A2 | 12/1988 | European Pat. Off. ........ | B29C 53/68 |
| 23 60 410 | 12/1979 | Germany .......................... | F16C 7/00 |

OTHER PUBLICATIONS

"Standard Insert" brand threaded inserts sheet (No Date).
Penn Engineering Manufacturing Corp., Danboro, PA, inserts sheet (No Date).
"150 Series" inserts sheet (No Date).

*Primary Examiner*—Harry C. Kim
*Attorney, Agent, or Firm*—Edward J. Brosius; F. S. Gregorczyk; Stephen J. Manich

[57] ABSTRACT

The present invention provides a composite turnbuckle comprising a pair of co-axial and spaced annular end fittings. Each end fitting has a threaded interior surface and an outer surface. The end fittings are made of metal. The turnbuckle has a body that extends between the end fittings. The body includes a non-metallic material. The end fittings are secured to the body to limit relative axial movement between the end fittings and the body. The turnbuckle may be used in connection with riggings of sailing vessels, for example.

21 Claims, 4 Drawing Sheets

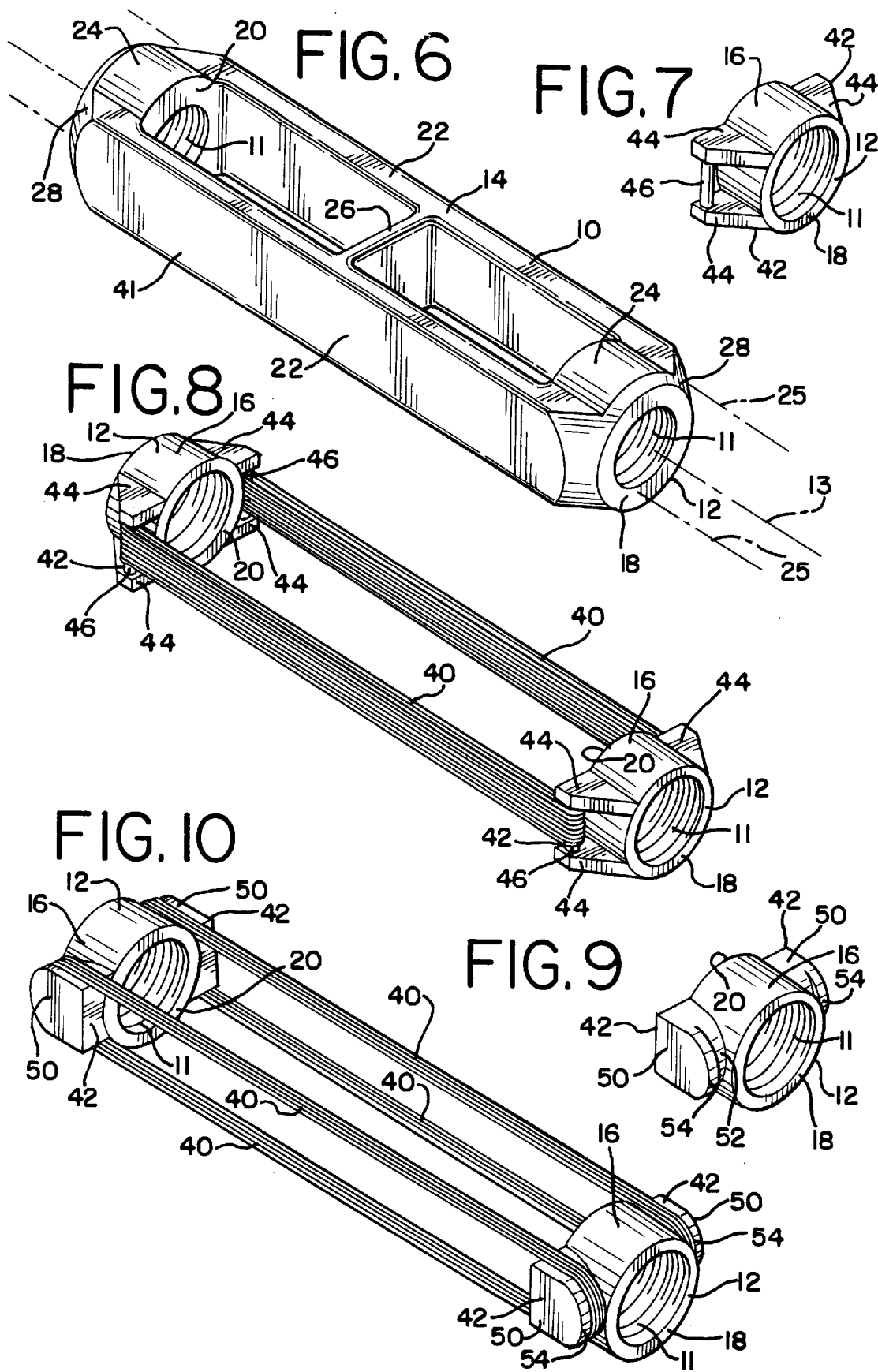

5,908,261

TURNBUCKLE AND METHOD OF MAKING A TURNBUCKLE

FIELD OF THE INVENTION

The present invention relates to turnbuckles, and in particular, to turnbuckles to be used with the standing riggings of sailing ships, and to a method of making such turnbuckles.

BACKGROUND OF THE INVENTION

Turnbuckles are known in the art, and have been used for tightening a rod, strand or rope. Typical turnbuckles are made of metal, such as steel or brass, and typically have two threaded ends which receive the threaded ends of rods or the like. The threaded ends are threaded in opposite hand, so that by turning the turnbuckle the rods, strands or ropes on both ends may be loosened or tightened.

Turnbuckles have been used in sailing ships for pre-loading the mast or masts in tension. A ship's standing rigging, such as the side stays that hold up the mast or masts, may be placed in tension to thereby place the mast or masts in tension by tightening turnbuckles attached to the stays. Loads of 100–30,000 pounds or more are typically placed on the turnbuckle.

The turnbuckles used on the side stays in sailing vessels may be located several feet above the water line, particularly if the mast has one or more spreaders. These metal turnbuckles therefore contribute not only to the overall weight of the ship, but also affect the center of gravity and overall stability of the ship. In so doing, the metal turnbuckles contribute to problems with moments and produce a multiplier effect due to the distance above the water line, requiring a higher weight keel to overcome the effects of the moments and multiplier.

In addition, the metal turnbuckles have been subject to oxidation, reducing their useful lives and detracting from the appearance of the products. This oxidation problem is worsened in the harsh environments encountered in sailing, particularly in the ocean sailing environment.

Such prior art turnbuckles have typically been made by casting the entire metal turnbuckle as one piece.

SUMMARY OF THE INVENTION

The present invention provides a turnbuckle of sufficient strength in tension to be used with the standing rigging of a ship, such as with the side stays, while substantially decreasing the weight of the turnbuckle. The turnbuckle of the present invention is made of two different materials. It includes a pair of metal end fittings and a body comprising a non-metallic material. The end fittings are co-axial and spaced from each other. The turnbuckle body extends between the end fittings. The body may comprise a matrix or composite material. The body and the end fittings are secured to limit relative axial movement between the end fittings and the body. Each end fitting has a threaded interior surface. Rod, strand or rope to be placed in tension may be received in the end fittings.

BRIEF DESCRIPTION OF THE DRAWINGS

FIG. 6 is a perspective view of another embodiment of a turnbuckle.

FIG. 7 is a perspective view of an end fitting suitable for use with the turnbuckle of FIG. 6.

FIG. 8 is a perspective view of one stage of production of a turnbuckle of the type shown in FIG. 6, showing two end fittings and with reinforcing fiber material placed on the end fittings and without a matrix material.

FIG. 9 is a perspective view of another embodiment of an end fitting that may be used with the turnbuckle of FIG. 6.

FIG. 10 is a perspective view of one stage of production of a turnbuckle of the type shown in FIG. 6, showing the two end fittings of FIG. 9 and with reinforcing fiber material placed on the end fittings and without a matrix material.

DETAILED DESCRIPTION

Figure 1:
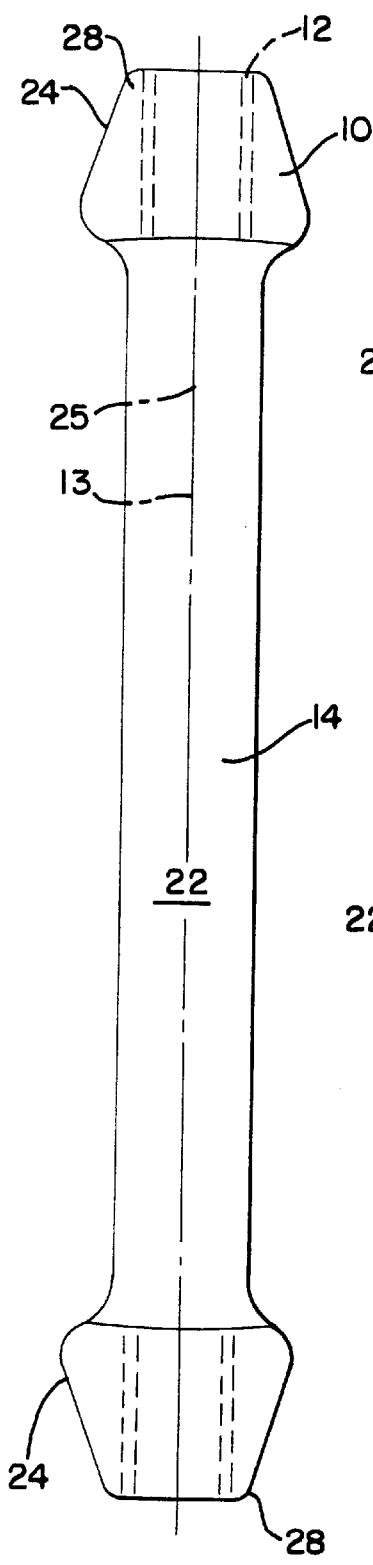
FIG. 1 is a side elevation of a turnbuckle of the present invention.

The turnbuckle 10 of the present invention includes a pair of spaced annular end fittings 12 and a body 14 substantially surrounding and extending between the end fittings 12. The illustrated end fittings 12 are annular and are made of metal, such as brass or steel, and each has an interior threaded surface 11. The end fittings are spaced and have a common central axis 13. The interior threads of the end fittings are of opposite hand so that turning the turnbuckle in one direction or the other will loosen or tighten the connection with a rope or rod extending axially through the open interiors of the end fittings. The end fittings 12 have outer surfaces 16, as shown in FIGS. 4, 5, 7, 9, 13–18 and 21, outward faces 18 and inward faces 20.

The body 14 of the illustrated turnbuckle includes a pair of side arms 22, integral end jackets 24 surrounding the outer walls 16 of the end fittings 12, and an integral bridge 26 joining the arms 22 midway between the end fittings. The side arms 22 are spaced apart and are parallel to each other. The side arms extend between the end jackets 24, and have longitudinal axes 25 parallel to the common central axis 13 of the end fittings 12. The body 14 may be formed of a non-metallic material that preferably bonds with the outer surface 16 of each metal end fitting 12. The two outward ends 28 of the illustrated body have a reduced diameter, and the width of the arms 22 is less than the widest diameter of the jacket 24, as shown in FIG. 1. It should be understood that the turnbuckle body may have a different shape than that illustrated; for example, instead of two arms and an integral bridge between the end fittings, the turnbuckle body may be a solid structure; the turnbuckle may also be longer, shorter, thicker or thinner than illustrated, and the ends of the turnbuckle need not be tapered as shown. Moreover, the end jackets 24 may cover the ends 18, 20 of the fittings 12 or leave them exposed; other parts of the fittings 12 could also be exposed or covered.

The body 14 and end fittings 12 are preferably anchored or secured to each other so that axial movement between the end fittings and the body is limited or prevented. In addition to or apart from bonding of the two materials comprising the body 14 and end fittings 12, the parts 12, 14 may be made to interlock or interference fit with each other to provide some structural impediment to axial movement. For example, the outer diameter of the outer surface 16 of the end fitting 12 may be made to vary between the inward face 20 and outward face 18, with the body jacket 24 extending over the areas of varying diameters.

Figure 19:
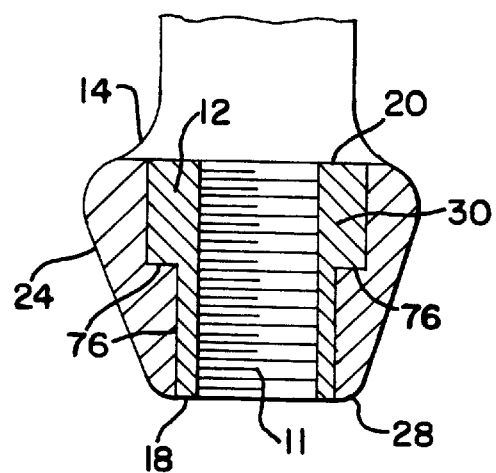
FIG. 19 is a cross-section of one end of a turnbuckle utilizing the end fitting of FIG. 16.

To provide such varying diameters, end fittings such as those shown in FIGS. 5, 7, 9, and 13–18 may be used. As shown in FIGS. 5, 16–17, and 19–21, the outer surface 16 of the end fitting 12 may have a raised annular flange 30 or spiral ribs 31, so that the body jacket 24 forms a mating retaining lip or surface 76 that physically limits outward axial movement of the end fittings, as shown in FIG. 19. The end fitting 12 could also have a frusto-conical outer surface 16, with the larger outer diameter at the inward face 20 of the end fitting 12, with the jacket 24 having a mating contacting surface so that when the turnbuckle is placed in tension, the shape of the jacket contacting surface would physically limit outward axial movement of the end fittings. To provide areas for interference fit between the end fittings 12 and the body 14, the outer surfaces 16 of the end fittings 12 could have a variety of shapes and forms of recesses, indentations, and depressions, such as a series of annular recesses; alternatively, the end fitting outer surfaces 16 may have a variety of shapes and forms of protrusions, ridges, raised rings, shoulders and bumps. Mating structures in the jacket 24 of the body 14 would serve to limit relative axial movement between the fittings 12 and the body 14.

Figure 16:
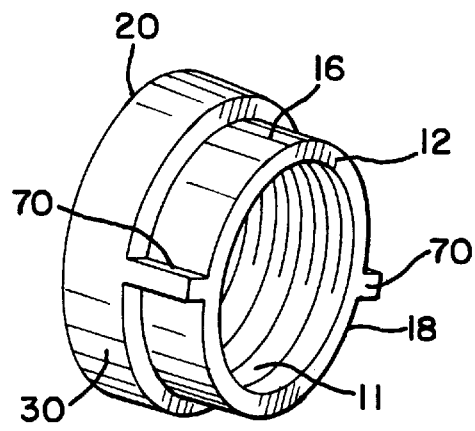
FIG. 16 is a perspective view of an alternate end fitting structure.
Figure 17:
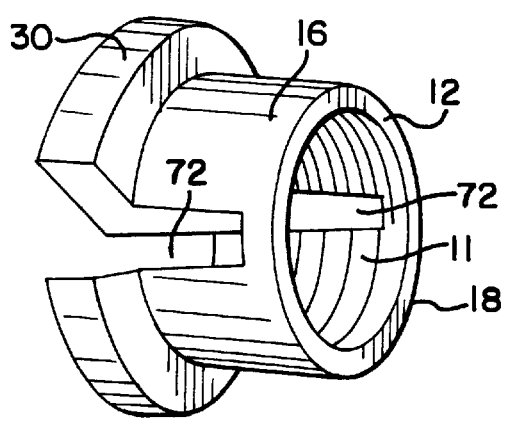
FIG. 17 is a perspective view of an alternate end fitting structure.
Figure 20:
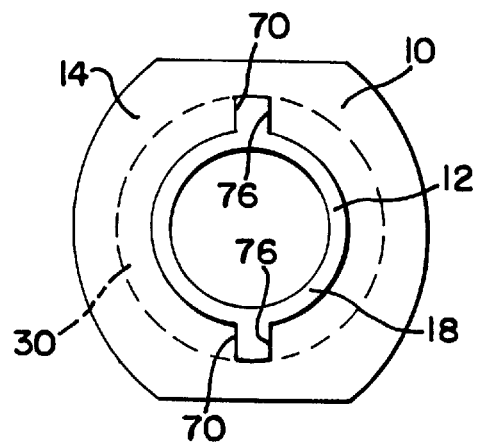
FIG. 20 is an end view of a turnbuckle utilizing the end fitting of FIG. 16.
Figure 18:
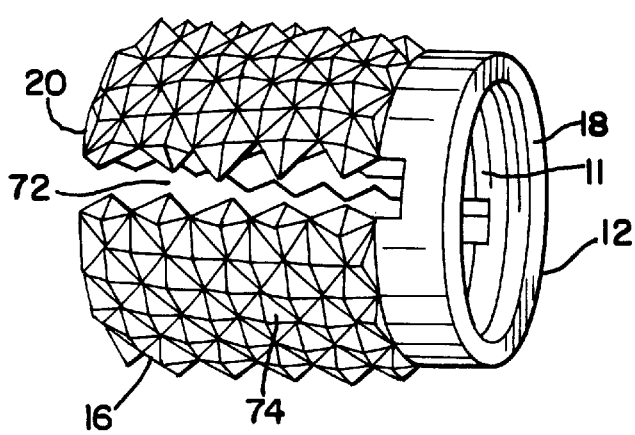
FIG. 18 is a perspective view of an alternate end fitting structure.
Figure 21:
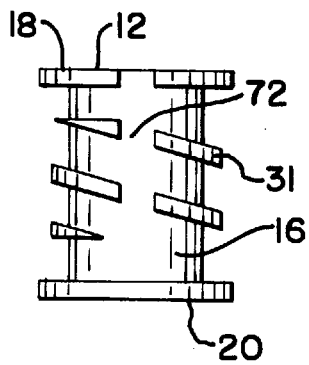
FIG. 21 is a side elevation of an alternate end fitting structure.

In addition to limiting relative axial movement between the fittings 12 and the body 14, it is desirable that the end fittings 12 and body be shaped to limit relative rotation between the end fittings 12 and the body 14. For this purpose, the end fittings 12 may have ridged, knurled or notched outer surfaces 16, such as shown in FIGS. 16–18 and 21, so that the jacket 24 of the body 14 forms a mating contact or retaining surface 76, such as shown in FIG. 20, for example, to limit relative rotation between the parts 12, 14. The outer surfaces 16 of the end fittings 12 may comprise raised ridges or keys 70 defining an angle with the flange 30 on the outer surface 16 of the end fittings as shown in FIG. 16. The end fitting outer surfaces 16 may have notches, indentations or grooves 72 in the outer surface 16 such as shown in FIG. 17, or a notch 72 in the rib 31 as shown in FIG. 21, or a textured surface, such as one with a knurled diamond pattern 74 such as shown in FIG. 18, with mating knurls on the contacting surfaces 76 of the body. The contacting surfaces 16, 76 may be used to limit or prevent both relative axial and rotational movement between the end fittings and the body. The rotation-limiting outer surface may be formed in casting the end fittings or in machining them, for example. The mating contact surfaces 76 in the body may be formed during casting of the body around the end fittings 12 to form the mating rotation limiting surfaces 70, 76 as shown in FIGS. 19–20. Commercially available fittings may be used for end fittings, such as those supplied by Penn Engineering & Manufacturing Corp. of Dan-boro, Pa., P. S. M. Fastener Corporation of Fairfield, N.J., and the 150 series of fittings supplied by the Witten Company, Inc. of Owasso, Okla. It should be understood that the above-named commercially-available fittings are identified for purposes of illustration only.

The body 14 is preferably made of a composite material, such as a composite of matrix and reinforcing fibers. Examples of suitable reinforcing fiber material that may be used to form the composite body 14 of the present invention are fibers such as aramid fibers sold under the trademark KEVLAR by E. I. DuPont deNemours & Co., Inc. of Wilmington, Del., and any thermoplastic fiber such as UHMWHDPE (ultra high molecular weight high density polyethylene) fibers sold under the trademark SPECTRA by Allied Signal Inc., of Morristown, N.J. and Colonial Heights, Va. Other fiber materials may also be used, such as carbon fiber or glass fiber. Suitable carbon fibers include those available from Amoco Performance Polymers of Apharetta, Ga.; suitable glass fibers include those available from Owens Corning of Toledo, Ohio. Preferably, the reinforcing fiber material is one that when embedded in a matrix gives sufficient tensile strength and minimal creep so that the end product will withstand at least the expected loads with a creep rate that yields a product with an acceptable useful life. The reinforcing fiber may be in the form of chopped fibers or elongate fibers or some combination of chopped and elongate fibers. It should be understood that the above-named commercial fiber materials are identified for purposes of illustration only, and the invention is not limited to those products.

The reinforcing fibers and end fittings 12 may be encapsulated in a molded matrix or resin to form the body 14. The matrix or resin may comprise, for example, thermoplastic or thermosetting resin. Thermoplastic resins are those that harden by lowering their temperature below the glass transition temperature (amorphous thermoplastics) or below their melting temperature (semi-crystalline thermoplastics). Examples of suitable thermoplastic resins include polycarbonate resins such as LEXAN available from GE Plastics (GE Company) of Pittsfield, Mass., CALIBRE available from the Dow Chemical Co. of Midland, Mich., and MAKROLON available from the Bayer Corporation Polymer Divisions of Pittsburgh, Pa. Other suitable thermoplastic matrix material includes acrylics such as ACRYLITE available from CYRO Industries of Rockaway, N.J., and polyamide 66 such as ZYTEL available from DuPont Engineering Polymers (E. I. DuPont deNemours & Co., Inc.) of Wilmington, Del. and ASHLENE available from Ashley Polymers, Inc. of Brooklyn, N.Y. Suitable thermoplastics also include polyacetals such as CELCON available from Hoest Celanese Corp.—Technical Polymers of Summit, N.J. and DELRIN available from DuPont Engineering Polymers (E. I. DuPont deNemours & Co., Inc.) of Wilmington, Del. Polybutylene teraphthalate PBT may also be used. Thermoset resin or matrix materials are those that harden after undergoing a chemical reaction or cure, wherein the molecules cross-link to render a material that cannot by re-melted and reused. Examples of suitable thermoset resins include epoxy, vinyl ester and unsaturated polyester. A suitable epoxy is FARBOSET available from Farboil Company of Baltimore, Md.; a suitable vinyl ester is KINEL available from the Ciba-Geigy Corporation of Brewster, N.Y.; and a suitable unsaturated polyester is ROSITE available from the Rostone Corporation of Lafayette, Ind. These thermoplastic and thermoset matrix materials are generally available in different grades, and the grade may be selected based upon design parameters for the turnbuckle. Preferably the matrix material will bond to the outer surface 16 of the metal end fittings. It should be understood that the commercial matrix materials identified above are identified for purposes of illustration only, and the present invention is not limited to those products.

The matrix material may include standard fillers such as glass beads, ceramic powder and mineral filler, and the matrix material forming the body could include such fillers without any reinforcing fiber. The term "composite" as used herein is intended to include such matrices with reinforcing fiber and no filler, with filler and no reinforcing fiber, and with both reinforcing fiber and filler. Depending on the material selected for the body and design parameters for the turnbuckle, the body could also be made of matrix material without filler or reinforcing fiber. Thus, the body generally comprises a non-metallic material that may include a matrix or a composite; metallic elements, such as a metal wire, could also be included in the body. Generally, any suitable or desirable matrix material, reinforcing fiber and filler may be used that is compatible with the end fittings selected and produces a product that meets design parameters.

Figure 2:
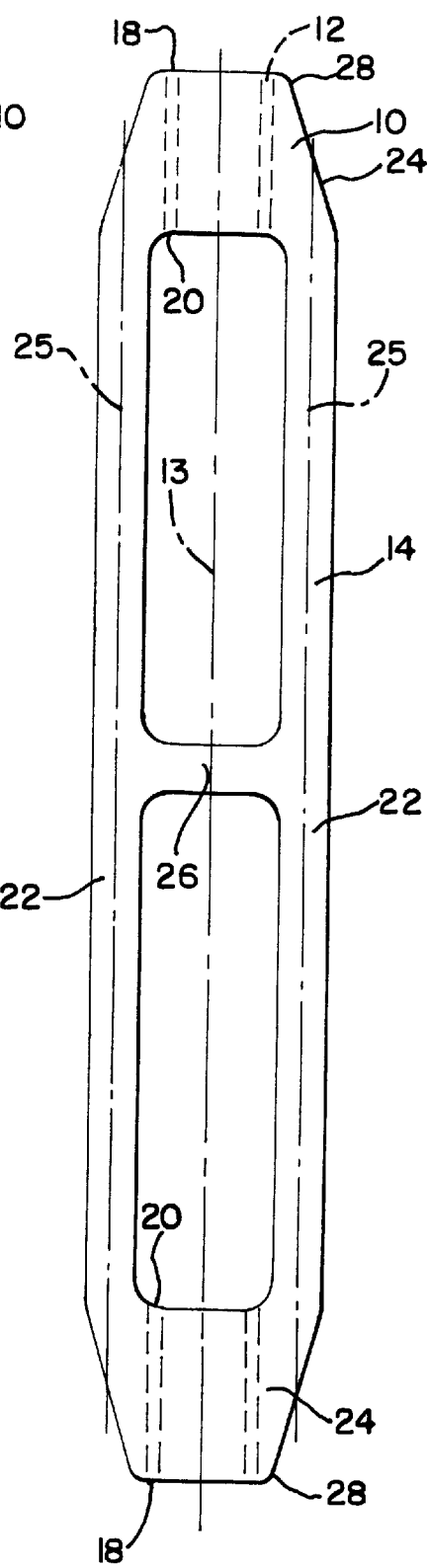
FIG. 2 is a top plan view of the turnbuckle of FIG. 1.
Figure 3:
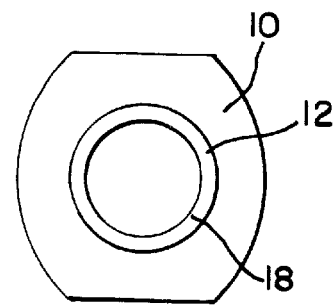
FIG. 3 is a end view of the turnbuckle of FIG. 1.
Figure 4:
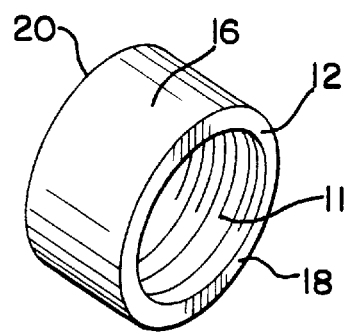
FIG. 4 is a perspective view of a metal end fitting for use with the turnbuckle of FIG. 1.
Figure 5:
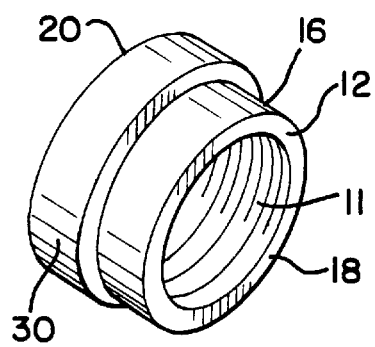
FIG. 5 is a perspective view of another embodiment of an end fitting suitable for use with the turnbuckle of FIG. 1.
Figure 11:
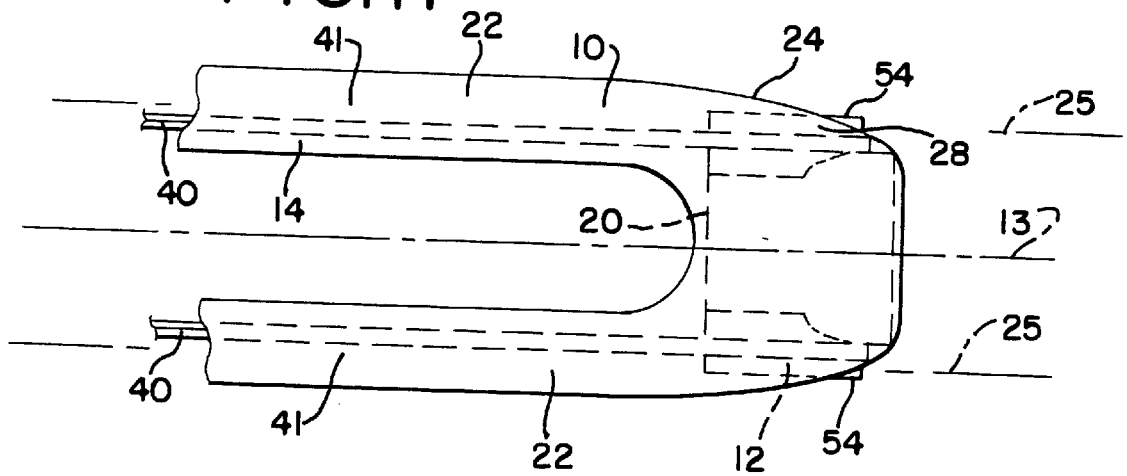
FIG. 11 a partial top plan view of the turnbuckle of FIG. 6 using the end fitting of FIG. 9.
Figure 12:
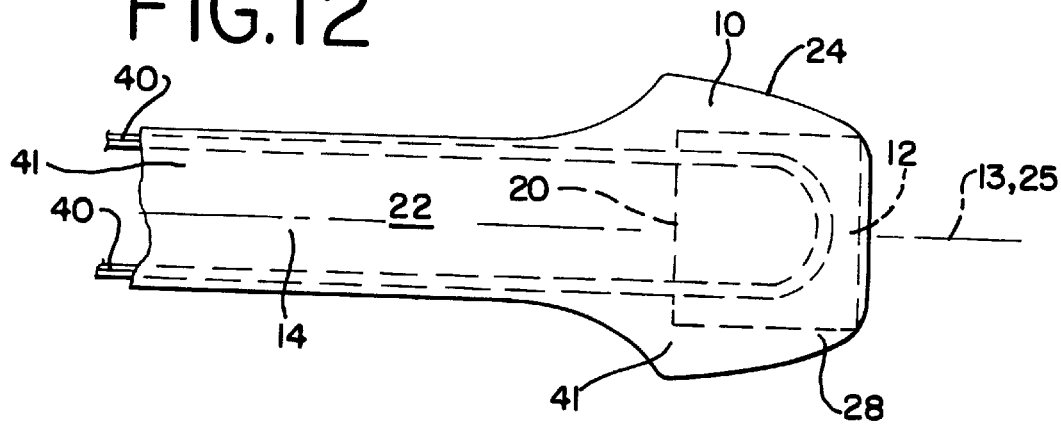
FIG. 12 is a partial side elevation of the turnbuckle of FIG. 6, using the end fitting of FIG. 9.

Any reinforcing fibers used may be randomly arranged in the matrix, as in the embodiment of FIGS. 1–2. It may be desirable to provide a physical connection between the elongate fibers 40 and the end fittings 12; for example, it may be desirable to wind the fiber circumferentially around the outer surface 16 of the end fittings and extending into the jacket 24 and arms 22 of the body. Elongate fibers 40 of reinforcing material may also be set to run longitudinally, between the two end fittings 12, as in the embodiments of FIGS. 8 and 10.

As shown in FIGS. 7–15, it may also be desirable to provide fiber supports 42 on the end fittings 12 on which elongate fibers 40 may be placed by winding, wrapping or looping fibers, or by positioning loops of fibers, as disclosed in the U.S. patent application entitled "Composite Article and Method of Making A Composite Article" filed concurrently herewith by William L. Foley, John D. Bush and Tim A. Osswald, and assigned to Amsted Industries, Inc., which is incorporated by reference herein in its entirety. As described in that patent application, and as shown in FIGS. 7–15, the end fittings 12 may have a pair of fiber supports 42 at the outer surfaces 16 of the end fittings 12, with elongate fibers 40 extending between the fittings 12 and over the fiber supports 42, as shown in FIGS. 8 and 10. It may be preferred to have an elongate fiber 40 extend over each fiber support more than once, as it is expected that the tensile strength of the composite body and its resistance to creep may be related to the number of wraps of the elongate fiber; creep may also be expected to be related to the length of the elongate fibers, with longer fibers being expected to result in less creep. Several elongate fibers 40 may be wrapped over the supports 42, and the wrapped elongate fibers could be used in combination with short randomly dispersed fibers in the matrix 41, with matrix and filler, with matrix filler and short reinforcing fibers, or with the matrix alone. The elongate fibers 40 need not all be of the same material: several different materials could be combined, and body could include lengths of wire in addition to or in place of the aramid, thermoplastic, glass or carbon fibers.

As shown in FIGS. 8 and 10, the elongate fibers 40 may be supported on two diametrically opposed fiber supports 42 on the end fittings 12. The fiber supports 42 on the opposite end fittings are preferably aligned, as shown in FIGS. 8 and 10, with the elongate fibers 40 along or parallel to the longitudinal axis 25 of the side arms 22 of the body 14.

Examples of fiber supports 42 that may be beneficially used with the present invention are shown in FIGS. 7, 9, and 13–15. These illustrated fiber supports 42 define support members or surfaces on which the elongate fibers may be placed: the elongate reinforcing fibers may be wound, wrapped or looped on the two end fittings as shown in FIGS. 8 and 10, or preformed fiber loops may be positioned on the supports 42. In the end fitting of FIG. 7, each fiber support 42 comprises a pair of flanges 44 extending outward from the outer surface 16 of the end fitting 12, with a cylindrical pin 46 extending between the flanges. The pin 46 is spaced from the outer surface 16 of the end fitting. An identical pair of flanges 44 and pin 46 are diametrically opposed to the first set. The other end fitting 12 has the same fiber support structures so that the reinforcing fiber may be placed on the pins 46 between the spaced end fittings. Thus, at least a portion of the pin 46 is spaced from the outer surface 16 of the fitting, and the fiber 40 extends over this portion of the pin. The spaced portion of the pin 46 defines a rounded support surface for the elongate fibers 40.

In the end fitting of FIG. 9, there are a pair of diametrically opposed shoulders 50 on the outer surface 16 of each end fitting 12. The outwardly directed part of each shoulder has a rounded support surface 52 to receive and hold a plurality of elongate fibers 40. Outward movement of the elongate fibers is limited by an upstanding retaining lip 54. Thus, as shown in FIG. 10, the elongate fibers 40 are between the retaining lip 54 and the outer surface 16 of the end fitting 12. The radius of curvature of the support surface 52 may be set to minimize the stress placed on the elongate fibers.

Figure 13:
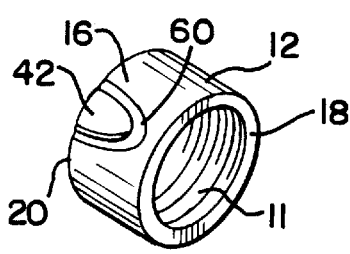
FIG. 13 is a perspective view of an alternate end fitting structure.
Figure 14:
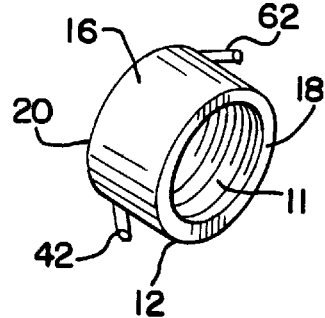
FIG. 14 is a perspective view of an alternate end fitting structure.
Figure 15:
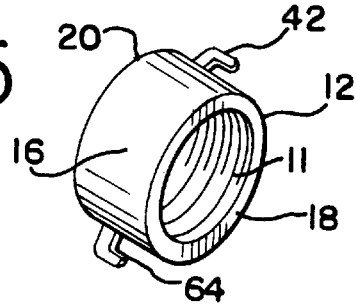
FIG. 15 is a perspective view of an alternate end fitting structure.

As shown in FIGS. 13–15, other structures could be used as fiber supports 42. There could be a curved groove 60 machined into the outer surface 16 of the end fittings 12 as shown in FIG. 13. A pair of cylindrical pins 62 could be set into the outer surface 16 of the end fittings 12 as shown in FIG. 14; the pins could be angled upwards as shown or could extend straight outwardly. Or a pair of hooks 64 could be set to extend outwardly from the outer surface 16 of the end fittings 12. Other structures could also be employed as fiber supports.

It may be desirable to combine the fiber supports 42 of FIGS. 7, 9 and 13–15 with a structure that provides an interference fit between the body 14 and end fitting 12 to further strengthen the end fitting/body interface against tension. Such a structure could include an indentation or groove in the outer surface 16 of the end fitting 12 and an inwardly expanding outer diameter of the end fitting. Such a groove could be beveled in one or two directions to further aid in providing this interference fit. With such fiber supports 42 on the end fittings, it should not be necessary to employ any additional structure or surface treatment to limit relative rotation between the end fittings and the body, since the fiber supports and mating body surfaces should prevent such relative rotation.

The present invention may be made by setting the end fittings 12 in a suitable mold or die cavity, and then introducing the uncured or liquid matrix material over the end fittings in the cavity. The matrix material may then be allowed to cure or harden to solid form. The matrix material, which may be a thermoplastic or thermoset resin, may be introduced into the cavity by known injection molding or resin transfer molding processes, and the form of solidification will depend on the type of materials used. Reinforcing materials or fillers may be present in the matrix as it is introduced into the mold or die. Reinforcements may comprise, for example, short randomly disposed and dispersed glass fibers in the matrix material.

For injection molding, known pressurized and heated screw feed equipment may be used to introduce the matrix material into the mold cavity. For resin transfer molding, a thermosetting matrix material is generally used and introduced into the mold cavity using known equipment. The viscosity of the matrix material preferably remains low during injection so that the matrix material may move through a bed of fibers without excessive heat or pressure.

In either injection molding or resin transfer molding, reinforcing fiber may be inserted into the mold or die cavity together with the metal end fittings before introducing the uncured or liquid matrix material. The reinforcing fiber may comprise a bed or group of loose or packed fibers, of any desired density, or a fiber preform, which may comprise a random arrangement or orientation of fibers or a predetermined arrangement or orientation. The fiber preform may also comprise elongate fibers 40 placed on the fiber supports 42, such as by winding or wrapping the elongate fibers 40 over the aligned pins 46 of the end fittings as shown in FIG. 8 or over the aligned rounded support surfaces 52 on the shoulders 50 of the end fittings as shown in FIG. 10. The fiber preform may also comprise a combination of elongate fibers 40 placed on the fiber supports together with randomly disposed fibers. Other fiber preform structures may also be used; for example, preformed loops of elongate fibers 40 may be placed on the pins 46 and shoulders 50. With the combination placed in a suitable mold or die, liquid matrix material may then be introduced into the mold or die to encapsulate or extend through the bed of fibers, and the liquid matrix may be allowed to cure to form the reinforced composite shown in FIGS. 1, 2, 6, 11 and 12. For the embodiment of FIGS. 7–8, the winding or wrapping may be done over the pins separate from the end fitting 12, with the pins later press fit into the flanges 44.

Alternative structures may be made through other processes. For example, it may be desirable to form the body separately from the end fittings. The body or arms could be formed by casting the matrix material, with or without reinforcing fibers and fillers, and then mechanically fixing the cast body 14 to the end fittings 12. The elements 12, 14 could be snap fit together with notches or knurled surfaces to limit movement, or could even be attached together with screws or the like. For example, the end fittings could comprise expansion inserts such as shown in FIGS. 17–18. Such a structure would have the advantage that a single body type could be made and kept on hand for later attachment to any of a variety of types of end fittings as the need arises.

The present invention may be used in the same manner as a prior art turnbuckle. In use on a sailing ship, ends of rigging rope may be inserted through each opening in each end fitting 12 of the turnbuckle 10 and the turnbuckle turned as in the prior art to tighten the rigging to place the rigging and mast in tension. The weight of the turnbuckle of the present invention is expected to be about one-fourth on the weight of a similarly-sized metal turnbuckle. Since the turnbuckle of the present invention is much lighter weight than the prior art metal turnbuckles, the center of gravity of the ship or boat is not as high with the present invention, and the weight of the ship or boat is decreased. And since significantly less metal is used, oxidation is less problematic.

Different sizes of turnbuckles may be produced with different internal diameters. It may be desirable, for example, to produce turnbuckles of two body sizes and a range of thread sizes, for example, eight thread sizes, so that one die may be used to produce turnbuckles for different size boats and for different loads. It may be most efficient to have one body size for several different thread sizes, for example, with one die or mold for a body to be used with end fittings accepting one-quarter inch, three-eighths inch, five-sixteenths inch and three-quarter inch threads.

It may also be desirable to produce turnbuckles of several different sizes. With a range of body sizes, and with a range of strength ratings, designers of structures using the turnbuckle will be given a greater range of choices. Moreover, turnbuckles with different strength ratings can be produced within a given range of body sizes by varying the number of loops of elongate fibers placed on the fiber supports. Other production parameters may also be varied to produce different strength ratings.

In the prior art, typical one-piece all-metal turnbuckles for use in marine environments, such as in ship riggings, have been made to accept wire diameters of from about $3/32$ inch to about $7/16$ inch, and rod or pin diameters of from about $1/4$ inch up to about $3/4$ inch. Tensile strengths of these commercially available all-metal turnbuckles have ranged from about 3300 lbs up to about 29,000 lbs., with working loads being limited to about 40% of the tensile strength. To have utility in this environment of use, the turnbuckle of the present invention should exhibit a similar range of tensile strengths at lower weights. To assure meeting these tensile strengths, the matrix material, reinforcing material, filler, shape of the body, and shape, strength and material of the end fittings may be adjusted: for example, instead of using a commercially available end fitting, it may be desirable to produce an end fitting that, together with a composite body of matrix and reinforcing fibers, produces a composite retaining lip of sufficient strength to meet the desired tensile strength without the end fitting pulling out; for example, the depth and height of any recess in the end fittings, or the axial and longitudinal extent of any outcropping that forms a mating retaining surface 76 in the composite casting may be selected to assure that a mating retaining lip of adequate strength is formed in the molded composite body. It may also be desirable to thicken the jacket 24 surrounding the end fitting to strengthen the turnbuckle 10 against pullout of the end fittings 12. The weight and sizes of the remaining parts of the composite body 14, such as the arms 22, may also be adjusted to minimize the weight while achieving the desired tensile strength. For the purpose of minimizing weight, it may be desirable to provide a variety of body sizes for the turnbuckles.

The turnbuckles of the present invention can also be used as tension, connecting or anchoring members in other environments. For example, it is expected that the turnbuckles of the present invention may be used with guy wires, or in other areas where light weight and resistance to oxidation are desirable. It is expected that the present invention may also be used to produce other types of bodies, with fittings other than annular end fittings.

While only specific embodiments of the invention have been described and shown, it is apparent that various additions and modifications can be made thereto. It is, therefore, the intention in the appended claims to cover all such additions and modifications as may fall within the true scope of the invention.

We claim:

1. A turnbuckle comprising:
   a pair of co-axial and spaced annular end fittings each having a threaded interior surface and an outer surface, the end fittings being made of metal;

a one-piece body extending between the end fittings, the body comprising a non-metallic material and including a pair of spaced jackets and a pair of spaced parallel arms, at least a part of one jacket overlying at least a part of the surface of one end of the surface of the other end fitting, and each arm being integral with and extending between the pair of jackets, each arm having a pair of edges and the edges of one arm being free from lateral connection to the edges of the other arm for a majority of the distance between the jackets;

the end fittings being secured to the body to limit outward axial movement of the end fittings relative to the body.

2. The turnbuckle of claim 1 wherein the body comprises a composite material.

3. The turnbuckle of claim 2 wherein the composite body comprises a fiber reinforced matrix material.

4. The turnbuckle of claim 3 wherein the fiber is selected from the group consisting of glass, carbon, thermoplastic and aramid fibers, and the matrix is selected from the group consisting of thermoset and thermoplastic materials.

5. The turnbuckle of claim 2 wherein the composite body comprises a filler and a matrix selected from the group consisting of thermoset and thermoplastic material.

6. The turnbuckle of claim 1 wherein the arms have outer surfaces, planes along the outer surfaces of the arms being at the outer surfaces of the jackets, and wherein the width of each of the arms between its edges is less than the outer dimension of each jacket in a plane centered between the arms.

7. The turnbuckle of claim 1 wherein each end fitting has an inward face and an outward face, the outer diameter of the outer surface of each end fitting varying between the inward and outward face, the jackets of the body being molded substantially around the outer surfaces of the end fittings and including inner surfaces of varying diameter extending over and molded to mate with the varying diameters of the outer surfaces of the end fittings to secure the end fittings and the body against relative axial movement.

8. The turnbuckle of claim 1 wherein the body includes a plurality of fibers randomly disposed in a matrix.

9. The turnbuckle of claim 1 wherein the end fittings are secured to the body to limit relative rotation between the end fittings and the body.

10. The turnbuckle of claim 9 wherein at least a part of one jacket contacts at least a part of one end fitting and at least a par of the other jacket contacts at least a part of the other end fitting, and wherein the contacting parts of the jackets and end fittings serve to limit relative rotation between the end fittings and the body.

11. The turnbuckle of claim 10 wherein the contacting parts of the jackets and end fittings limit relative axial movement of the end fittings.

12. The turnbuckle of claim 1 wherein the turnbuckle has a tensile strength of at least 3300 lbs.

13. The turnbuckle of claim 1 wherein said body includes an integral transverse bridge extending between the arms.

14. The turnbuckle of claim 1 wherein the arms are free from reinforcing metal.

15. The turnbuckle of claim 1 wherein the turnbuckle is for use with a sailing vessel having a standing rigging, the turnbuckle having a tensile strength great enough for use with the standing rigging of the sailing vessel.

16. A turnbuckle comprising:

a pair of co-axial and spaced annular metallic end fittings each having a threaded interior surface and an outer surface;

a one-piece non-metallic body extending between the end fittings and including a pair of integral spaced jackets, each jacket being at one end fitting and having an interior surface mating with the outer surface of the end fitting, the body being made of a composite material formed by molding around the end fittings;

the mating surfaces of the end fittings and jackets securing the end fittings against outward axial movement relative to the body;

the turnbuckle is free from mechanical fasteners securing the jackets to the end fittings;

wherein each end fitting has an inward face and an outward face, the outer diameter of the outer surface of each end fitting varying between the inward and outward face, the jackets of the body being molded substantially around the outer surfaces of the end fittings, the inner surfaces of the jackets having varying diameters extending over and molded to mate with the varying diameters of the outer surfaces.

17. The turnbuckle of claim 16 wherein the body is free from reinforcing metal.

18. The turnbuckle of claim 16 wherein the turnbuckle is for use with a sailing vessel having a standing rigging, and wherein the turnbuckle has a tensile strength great enough for use with the standing rigging of the sailing vessel.

19. The turnbuckle of claim 16 wherein each jacket substantially surrounds the outer surface of each end fitting and wherein the body includes a pair of spaced parallel arms integral with and extending between the jackets.

20. The turnbuckle of claim 16 wherein the composite body comprises a fiber reinforced matrix material and wherein the fiber is selected from the group consisting of glass, carbon, thermoplastic and aramid fibers, and the matrix is selected from the group consisting of thermoset and thermoplastic materials.

21. The turnbuckle of claim 16 wherein the turnbuckle has a tensile strength of at least 3300 lbs.

* * * * *